United States Patent
Tran et al.

(10) Patent No.: US 9,453,530 B2
(45) Date of Patent: Sep. 27, 2016

(54) COMPACT INTEGRATED PERIMETER THRUST BEARING

(71) Applicants: ThinKom Solutions, Inc., Torrance, CA (US); ATEC Corporation, Cypress, CA (US)

(72) Inventors: Anh Tran, Cypress, CA (US); Jason Woolman, Signal Hill, CA (US); Dan Roman, Cerritos, CA (US)

(73) Assignee: ThinKom Solutions, Inc., Hawthorne, CA (US)

( * ) Notice: Subject to any disclaimer, the term of this patent is extended or adjusted under 35 U.S.C. 154(b) by 89 days.

(21) Appl. No.: 14/303,110

(22) Filed: Jun. 12, 2014

(65) Prior Publication Data
US 2015/0362010 A1 Dec. 17, 2015

(51) Int. Cl.
*F16C 19/54* (2006.01)
*F16C 43/06* (2006.01)
(Continued)

(52) U.S. Cl.
CPC .............. *F16C 19/542* (2013.01); *F16C 19/10* (2013.01); *F16C 19/163* (2013.01); *F16C 19/181* (2013.01); *F16C 19/50* (2013.01); *F16C 25/083* (2013.01); *F16C 43/06* (2013.01); *H01Q 1/125* (2013.01); *H01Q 3/04* (2013.01); *F16C 2240/80* (2013.01); *Y10T 29/49647* (2015.01)

(58) Field of Classification Search
CPC ...... F16C 19/10; F16C 19/30; F16C 19/541; F16C 19/546; F16C 25/083; F16C 27/08; F16C 33/583; F16C 33/64; F16C 33/761; F16C 35/06; F16C 2229/00; F16C 2352/00
USPC ......... 384/97, 105, 504, 516, 517, 611, 613, 384/615, 619, 521; 29/898.041
See application file for complete search history.

(56) References Cited

U.S. PATENT DOCUMENTS

| 1,832,312 A | 11/1931 | Lutz |
| 3,370,899 A * | 2/1968 | Eklund ................. F16C 33/585 384/516 |

(Continued)

FOREIGN PATENT DOCUMENTS

| DE | 28 52 345 | 6/1980 |
| DE | 10 2010 043599 | 5/2012 |

(Continued)

OTHER PUBLICATIONS

Extended European Search Report dated Nov. 13, 2015 for corresponding European application No. 15170501.9.

*Primary Examiner* — Marcus Charles
(74) *Attorney, Agent, or Firm* — Renner, Otto, Boisselle & Sklar, LLP

(57) ABSTRACT

A bearing for providing rotation of at least one intermediate part relative to a first part and a second part includes a first bearing race formed in the first part, the first bearing race having a raceway corresponding to a first diameter, and a second bearing race and a third bearing race formed in the at least one intermediate part, the second bearing race and third bearing race having a raceway corresponding to a second diameter, wherein the first diameter is different from the second diameter. Further, a fourth bearing race is formed in the second part, the fourth bearing race having a raceway corresponding to the first diameter. A first plurality of roller elements are arranged between the first raceway and the second raceway, and a second plurality of roller elements are arranged between the third raceway and the fourth raceway.

15 Claims, 6 Drawing Sheets

(51) Int. Cl.
*F16C 19/10* (2006.01)
*H01Q 1/12* (2006.01)
*F16C 19/08* (2006.01)
*F16C 19/16* (2006.01)
*F16C 19/18* (2006.01)
*F16C 19/50* (2006.01)
*F16C 25/08* (2006.01)
*H01Q 3/04* (2006.01)

(56) References Cited

U.S. PATENT DOCUMENTS

| | | | | |
|---|---|---|---|---|
| 3,449,030 A * | 6/1969 | Rouviere | ................ | E21B 4/003 384/611 |
| 3,652,140 A * | 3/1972 | Bruno | .................... | F16C 19/54 384/613 |
| 3,712,693 A * | 1/1973 | Root | ...................... | F16C 33/48 384/619 |
| 3,786,378 A | 1/1974 | Liguori | | |
| 4,042,284 A * | 8/1977 | Coster | ................ | B29C 47/0801 384/613 |
| 4,346,948 A * | 8/1982 | Kristiansen | ............. | F04D 29/36 384/611 |
| 4,729,675 A * | 3/1988 | Trzeciak | ................. | E21B 4/003 175/107 |
| 4,916,751 A * | 4/1990 | Sumita | ................... | F16C 33/60 384/448 |
| 5,074,681 A * | 12/1991 | Turner | ................... | E21B 4/003 175/107 |
| 5,536,091 A * | 7/1996 | Takata | ................... | F16H 15/38 384/609 |
| 5,690,434 A * | 11/1997 | Beshoory | ................ | E21B 4/003 175/107 |
| 6,733,415 B2 * | 5/2004 | Yamamoto | .............. | F16C 19/30 384/615 |
| 7,371,011 B2 * | 5/2008 | McKeirnan, Jr. | ....... | F01D 25/16 384/504 |
| 7,708,468 B2 * | 5/2010 | Dambaugh | ............. | F16C 19/30 384/619 |
| 7,909,515 B2 * | 3/2011 | Takimoto | ............. | F16C 19/182 384/504 |
| 2009/0028483 A1 * | 1/2009 | Kawaguchi | ........... | F16C 19/182 385/475 |
| 2011/0001379 A1 * | 1/2011 | McCarthy | ............... | F16C 19/10 310/90.5 |
| 2011/0129178 A1 * | 6/2011 | Shitsukawa | ......... | B60C 27/0005 384/589 |
| 2012/0275736 A1 * | 11/2012 | Foote | ..................... | F16C 33/76 384/462 |

FOREIGN PATENT DOCUMENTS

| | | | | |
|---|---|---|---|---|
| DE | 10 2012 215584 | | 3/2014 | |
| FR | 1 284 704 | | 2/1962 | |
| FR | 2802990 A1 * | | 6/2001 | ............ A63C 17/22 |
| JP | 2004353741 A * | | 12/2004 | |
| WO | WO 9902873 A1 * | | 1/1999 | ............ F16C 19/14 |

* cited by examiner

COMPACT INTEGRATED PERIMETER THRUST BEARING

TECHNICAL FIELD

The present invention relates generally to bearings and, more particularly, to an integrated angular contact thrust bearing system.

BACKGROUND ART

Bearing assemblies are typically separate, independent assemblies that are mounted to components to be rotated. FIGS. 1A-1C illustrate a perspective view, side view and cross-sectional view of a conventional thrust bearing 10 in the form of a duplex-pair bearing and includes, for example, an outer portion 12 having a first diameter, and an inner portion 14 having a second (smaller) diameter. The outer portion 12 may be coupled to a first object (e.g., a hub) while the inner portion 14 may be coupled to a second object (e.g., an axle spindle) to enable relative rotation between the first and second objects.

Arranged within the bearing assembly 10 is a first roller element set 16 and a second roller element set 18, each roller element set 16 and 18 including a plurality of roller elements 20 circumferentially spaced apart from one another between the outer portion 12 and the inner portion 14. Each roller element set may include a cage 22 for maintaining the circumferential spacing between adjacent roller elements 20. Each roller element 20 of the roller element sets 16 and 18 ride on an outer race 24 (which is adjacent to the outer part 12) and an inner race 26 (which is adjacent to the inner part 14). The outer and inner races 24 and 26 are configured to correspond to a diameter of the roller elements 20. A rolling surface of the inner race 26 may be axially offset 28 from a rolling surface of the outer race 24 to provide axial stiffness in one direction. By opposing the offset between the first roller element set 16 and the second roller element set 18, axial stiffness in both directions can be achieved.

While conventional thrust bearings provide a satisfactory means for rotating one object relative to another while providing axial stiffness, in applications requiring compact profiles such bearings can become a limiting factor as they can occupy a significant volume. In the case of variable inclination continuous transvers stub (VICTS) antennas, each rotating component typically includes a separate bearing that requires mounting features and additional volume. This results in a less efficient antenna for a given volume.

SUMMARY OF INVENTION

A thrust bearing assembly in accordance with the present disclosure includes a plurality of raceways arranged in a stacked configuration. Raceways sharing a common roller element have different diameters from one another, thereby providing opposite contact angles for each raceway pair and roller element of the bearing of the stack. The resulting bearing occupies less volume than conventional bearing assemblies and therefore is advantageous in applications that are space-limited.

The bearing system in accordance with the present disclosure can be used, for example, in Continuous Transverse Stub (CTS) and Variable Inclination Continuous Transverse Stub (VICTS) antenna arrays. Additionally, any rotating system requiring axial stiffness in both directions, as well as radial stiffness, with volume constraints will also benefit from the bearing system.

In accordance with one aspect of the invention, a bearing for providing rotation of at least one intermediate part relative to a first part and a second part includes: a first bearing race formed in the first part, the first bearing race having a raceway corresponding to a first diameter; a second bearing race and a third bearing race formed in the at least one intermediate part, the second bearing race and third bearing race having a raceway corresponding to a second diameter, wherein the first diameter is different from the second diameter; a fourth bearing race formed in the second part, the fourth bearing race having a raceway corresponding to the first diameter; a first plurality of roller elements arranged between the first raceway and the second raceway; and a second plurality of roller elements arranged between the third raceway and the fourth raceway.

In accordance with one aspect of the invention, a diameter of the first plurality of roller elements is an average of the first diameter and the second diameter.

In accordance with one aspect of the invention, a diameter of the second plurality of roller elements is an average of the first diameter and the second diameter.

In accordance with one aspect of the invention, at least one of
  i) the first race and the first part are formed from the same material,
  ii) the second race, the third race and the at least one intermediate part are formed from the same material, or
  iii) the fourth race and the second part are formed from the same material.

In accordance with one aspect of the invention, at least one race is formed from at least one of aluminum, steel, titanium, ceramic or plastic.

In accordance with one aspect of the invention, the first plurality of roller elements and the second plurality of roller elements are formed from aluminum, steel, titanium, ceramic or plastic.

In accordance with one aspect of the invention, the bearing includes: a support structure arranged relative to the first part; and a biasing member arranged between the support structure and the first part, the biasing member urging the first part toward the second part to preload the first part, the at least one intermediate part and the second part.

In accordance with one aspect of the invention, the bearing includes an outer housing, wherein the first part, the at least one intermediate part and the second part are arranged between the base structure and the outer housing.

In accordance with one aspect of the invention, the biasing member comprises a spring.

In accordance with one aspect of the invention, the spring comprises a wave spring.

In accordance with one aspect of the invention, a difference between the first diameter and the second diameter is between four-thousandths of an inch and eight-thousandths of an inch.

In accordance with one aspect of the invention, the at least one intermediate part comprises a plurality of intermediate parts arranged in a stacked configuration between the first part and the second part, each of the plurality of intermediate parts including two raceways corresponding to either the first diameter or the second diameter, wherein raceways of adjacent parts correspond to different diameters.

In accordance with one aspect of the invention, an antenna includes at least one platter and a bearing as described herein, wherein the at least one platter is mechanically coupled to an intermediate part of the bearing.

In accordance with one aspect of the invention, the at least one platter comprises a plurality of platters, and the at least one intermediate part comprises a plurality of intermediate parts, each of the plurality of platters mechanically connected to a respective one of the plurality of intermediate parts.

In accordance with one aspect of the invention, a method of manufacturing a thrust bearing integral with an object to be rotated is provided, the object including a first part, at least one intermediate part, and a second part. The method includes: forming a first bearing race in the first part, the first bearing race having a raceway corresponding to a first diameter; forming a second bearing race and a third bearing race in the at least one intermediate part, the second bearing race and third bearing race having a raceway corresponding to a second diameter, wherein the first diameter is different from the second diameter; forming a fourth bearing race in the second part, the fourth bearing race having a raceway corresponding to the first diameter; arranging a first plurality of roller elements between the first raceway and the second raceway; and arranging a second plurality of roller elements between the third raceway and the fourth raceway.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

The bearing assembly in accordance with the present disclosure will be described in the context of an antenna array, such as a VICTS antenna array. The bearing assembly in accordance with the present disclosure, however, is applicable to any rotating system requiring a thrust bearing, where space is limited and/or where cost is a significant consideration.

Figure 2A:
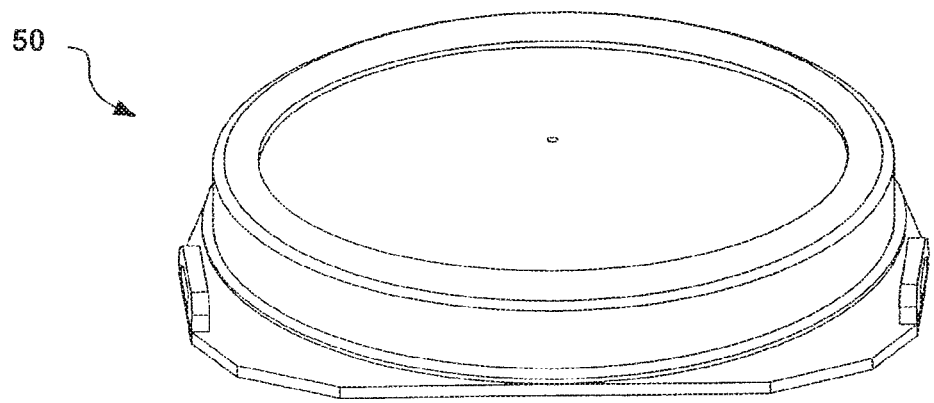
FIG. 2A is a perspective view of an exemplary antenna that may use the bearing assembly in accordance with the present disclosure.
Figure 2B:
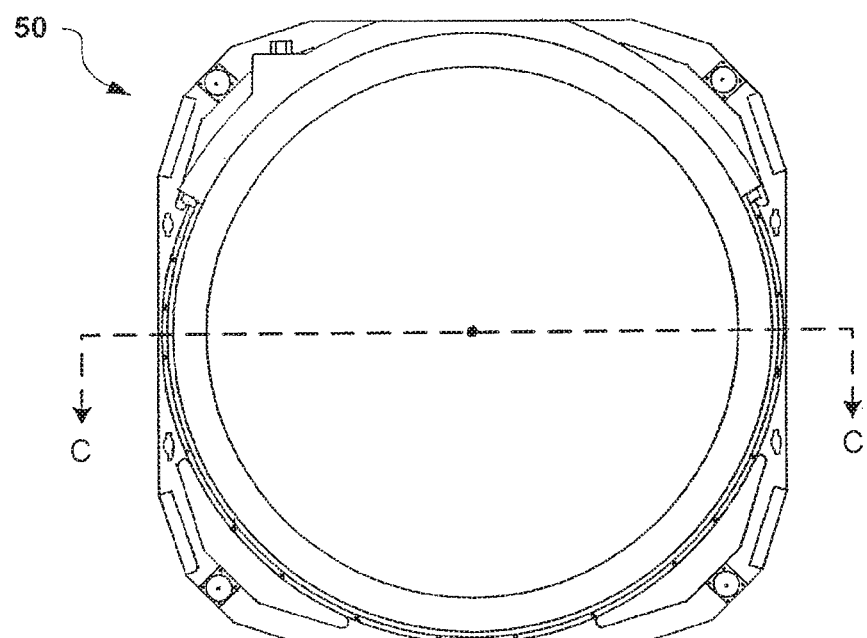
FIG. 2B is a top view of the antenna shown in FIG. 2A.
Figure 2C:
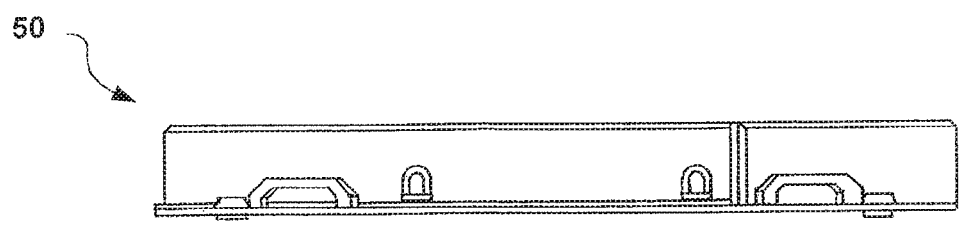
FIG. 2C is a side view of the antenna shown in FIG. 2A.
Figure 2D:
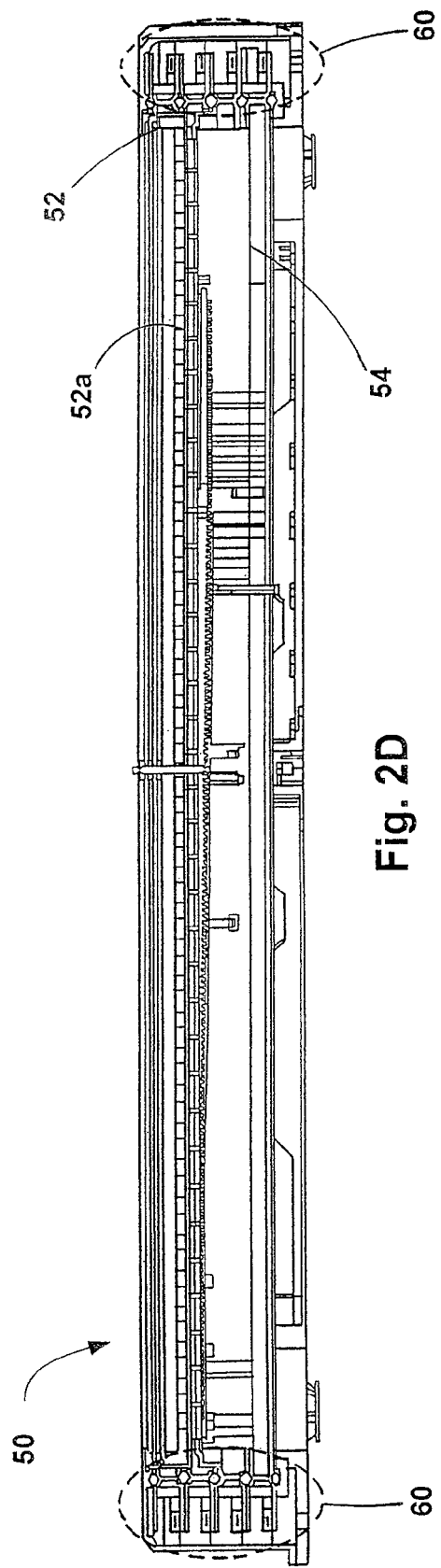
FIG. 2D is a cross-sectional view of the bearing assembly in FIGS. 2A-2C along line B-B.

Referring initially to FIGS. 2A-2D, illustrated are a perspective view, top view, side view and cross-sectional view of an exemplary VICTS antenna array 50 in which the thrust bearing in accordance with the present disclosure may be utilized. As best seen in FIG. 2D, the exemplary VICTS antenna array 50 includes a first (upper) plate 52 having a one-dimensional lattice of continuous radiating stubs 52a, and a second (lower) plate 54 having one or more line sources emanating into a parallel-plate region formed and bounded between the first and second plates 52 and 54. Mechanical rotation of the upper plate 52 relative to the lower plate 54 serves to vary the inclination of incident parallel-plate modes, launched at the line source(s), relative to the continuous transverse stubs 52a in the upper plate 52, and in doing so constructively excites a radiated planar phase-front whose angle relative to the mechanical normal of the array is a simple continuous function of the relative angle of (differential) mechanical rotation between the two plates. Common rotation of the two plates 52 and 54 in unison moves the phase-front in the orthogonal azimuth direction.

Accordingly, the radiating stub aperture of the VICTS antenna is comprised of a collection of identical, parallel, uniformly-spaced radiating stubs 52a over its entire surface area. The stub aperture serves to couple energy from a parallel-plate region (formed between the upper-most conductive surface of the array network and the lower-most conductive surface of the radiating stub aperture structure).

In order provide relative rotation between each rotating component of the VICTS antenna 50 (e.g., between the first and second plates 52 and 54), separate thrust bearing assemblies have been conventionally utilized. While such configuration provides satisfactory operation, the use of separate bearing assemblies tends to occupy a significant volume within the antenna array. As will be appreciated, in any mechanical design one of the most important requirements is the allowable volume for the designed object. Any reduction in the volume occupied by the object can be considered an improvement.

Figure 1A:
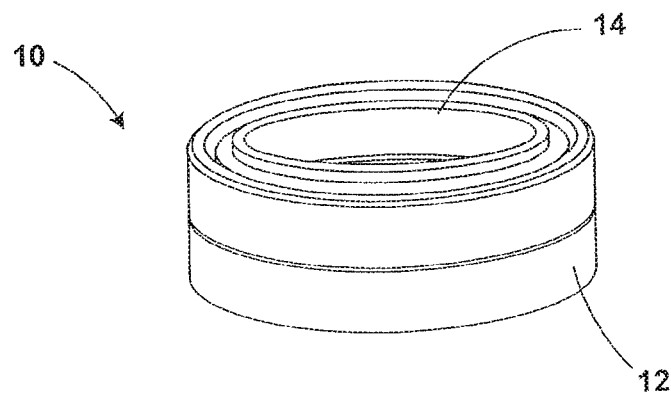
FIG. 1A is a perspective view of a conventional thrust bearing assembly.
Figure 1B:
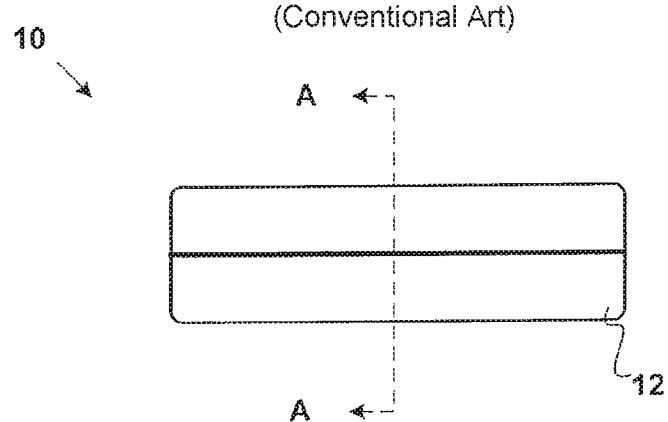
FIG. 1B is a side view of the thrust bearing assembly of FIG. 1A.
Figure 1C:
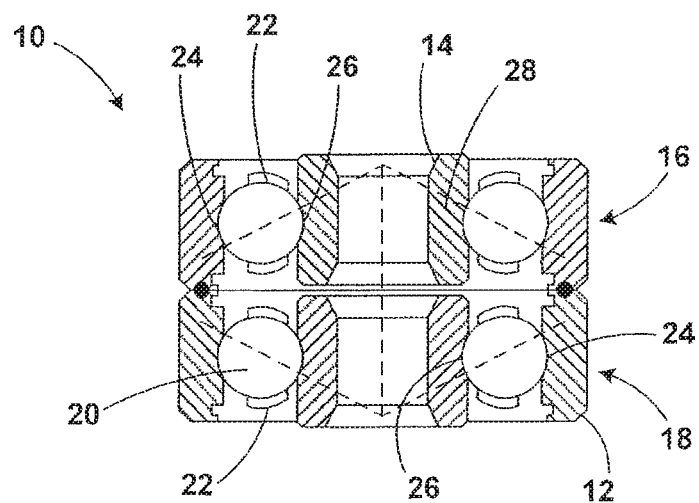
FIG. 1C is a cross-sectional view of the thrust bearing assembly of FIG. 1B along line A-A.

With continued reference to FIG. 2D, an integrated perimeter thrust bearing 60 in accordance with the present disclosure succeeds in reducing the overall volume (and complexity) by integrating the separate bearing assemblies into rotating components of the objects to be rotated, and by reducing the number of bearings required for multiple rotating components. For example, the integrated perimeter thrust bearing 60 in accordance with the present disclosure integrates bearing raceways into the rotating components, thus reducing required volume and producing a more compact system (e.g., by reducing the number of bearings). Further, alternating angular contact pairs can be integrated into the rotating component. Such alternating angular contact pairs produce opposite angular contact angles in the rotating member. Conventionally, a pair of angular contact bearings are required (with opposite contact angles—see FIG. 1C) to realize stiffness in both axial directions for each rotating component, each pair of bearings being "grounded" (fixed) to a stationary surface. By realizing opposite angular contact angles in the rotating member, the need for a "pair" of bearings for each rotating component is eliminated thus producing a more compact system.

Such integration provides several advantages. For example, a separate bearing assembly and the features required to mount/house the bearings are eliminated, which can reduce the required radial volume. Further, by integrating a pair of angular contact bearings and sharing them between two rotating components, vertical volume is reduced.

For example, a VICTS antenna with four rotating components would require eight conventional angular contact bearings (or equivalently four duplex pairs). Using the integrated perimeter thrust bearing in accordance with the present disclosure, the number of required bearings is reduced to N+1 instead of N×2, where N=the number of rotating components.

Figure 3A:
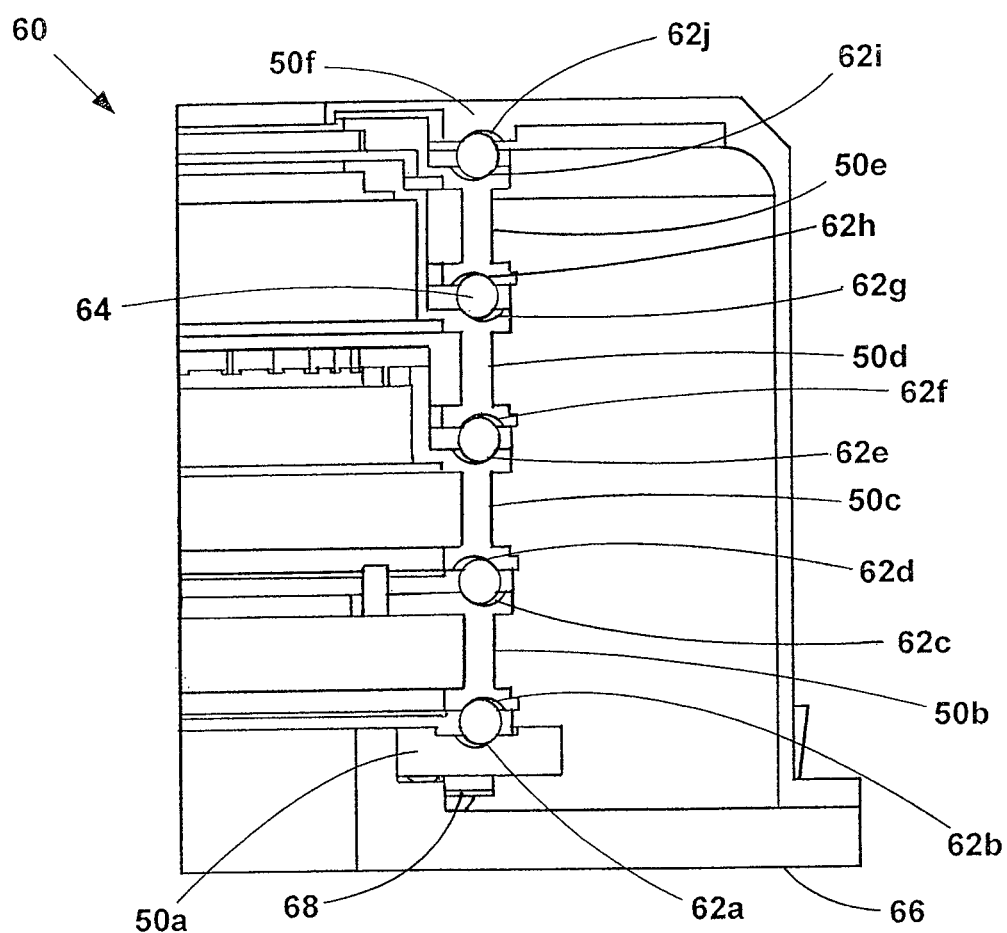
FIGS. 3 A and 3B are detail views of a portion of the bearing shown in FIG. 2D and illustrate the difference in diameters between a top race and a bottom race for a particular roller element, as well as the staggered diameter change from race to race.
Figure 3B:
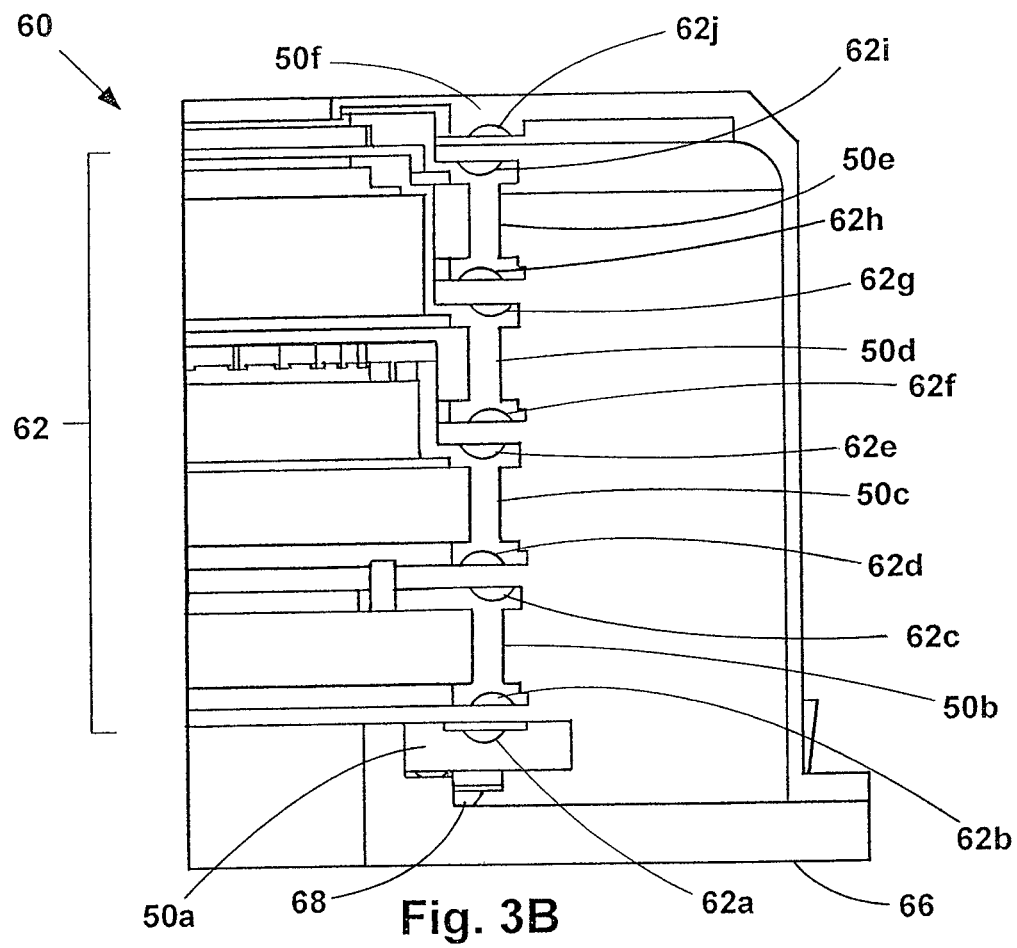

With reference to FIGS. 3A and 3B, illustrated in cross-section is a bearing portion of the VICTS antenna 50 of FIG. 2D showing in more detail the thrust bearing 60 in accordance with the present disclosure. The thrust bearing 60 includes a stacked arrangement of races 62 formed within rotating members, with roller elements 64 arranged between adjacent races 62. The thrust bearing 60 in accordance with the present disclosure provides an alternating angular contact pair between rotating members, thereby providing axial stiffness in two opposing directions. FIGS. 3A and 3B illustrate the alternating angular contact pair arrangement, which is implemented via alternating raceway diameters and thrust angles (FIG. 3B omits the roller elements 64 to more clearly show the alternating diameters and thrust angles).

With continued reference to FIGS. 3A and 3B, the exemplary bearing 60 includes a base 66 (e.g., a stationary base), and first bearing race 62a formed in a first part 50a of the VICTS antenna array 50, the first bearing race having a raceway corresponding to a first diameter. The first bearing race 62a, which may float relative to the base 66, may not be a rotatable part of the bearing assembly. A second bearing race 62b and a third bearing race 62c are formed in an intermediate part 50b (e.g., a first rotatable member) of the VICTS antenna array 50, the second bearing race 62b and third bearing race 62c having a raceway corresponding to a second diameter, the second diameter being different from the first diameter. Preferably, a difference between the first diameter and the second diameter is between four-thousandths of an inch and eight-thousandths of an inch, although larger variations are contemplated. A fourth bearing race 62d and a fifth bearing race 62e are formed in another intermediate part 50c (e.g., a second rotatable member) of the VICTS antenna array 50, the fourth bearing race 62d and fifth bearing race 62e having a raceway corresponding to a first diameter.

The above alternating pattern can repeat for as many number of rotating members that are utilized in the system. In the exemplary embodiment shown in FIGS. 3A and 3B, there are a total of four different rotatable elements. Thus the system further includes a sixth bearing race 62f and a seventh bearing race 62g formed in another intermediate part 50d (e.g., a third rotatable member), the sixth bearing race 62f and seventh bearing race 62g having a raceway corresponding to a second diameter, an eighth bearing race 62h and a ninth bearing race 62i formed in intermediate part 50e (e.g., a fourth rotatable member), the eighth bearing race 62h and ninth bearing race 62i having a raceway corresponding to a first diameter, and finally a tenth bearing race 62j formed in a housing (end) 50f of the assembly, the tenth bearing race having a raceway corresponding to the second diameter. Roller elements 64 are arranged between race pairs. The housing 50f, which may be a non-rotatable member, may be attached to the base 66 to enclose the bearing assembly. A diameter of the roller elements may be an average of the first diameter and the second diameter. Preferably, the roller elements are formed from steel (e.g., stainless steel), though other appropriate metallic, ceramic or other materials may be employed (e.g., aluminum, titanium or plastic).

Arranged between the base 66 and the first bearing race 62a is a biasing member 68, such as a wave spring. The biasing member 68 can apply an axial force to the bearing assembly thereby urging the first bearing race 62a toward the housing 50f and thus providing a desired pre-determined bearing preload.

When the components are assembled and preloaded the contact angle is realized, and thus so is the stiffness. As will be appreciated by one having ordinary skill in the art, the raceway diameters can be manipulated and any contact angle can be achieved until the required stiffness is met. Further, raceways sharing a common roller element may be offset from one another to enhance axial, radial, and moment stiffness.

While the exemplary bearing 60 shown in FIGS. 3A and 3B has a total of 10 races and five roller element sets, it should be appreciated that less races and roller elements can be used without departing from the scope of the invention. For example, in order to provide axial stiffness in two opposing directions, the stacked assembly should have at least two roller element sets and four races. Thus, the bearing 60 may include only a first race formed in a first part with a raceway corresponding to the first diameter, a second and third race formed in an intermediate part with raceways corresponding to the second diameter, and a third race formed in an outer part with a raceway corresponding to the first diameter. Further, a first plurality of roller elements may be arranged between the first and second races, and a second plurality of roller elements may be arranged between the third and fourth races.

Figure 4:
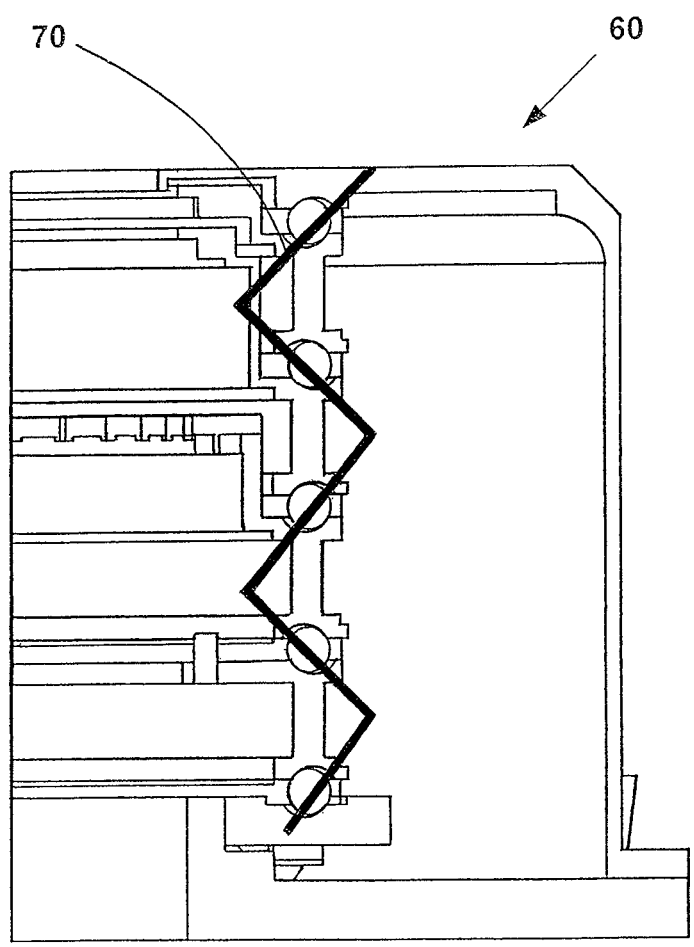
FIG. 4 is a simplified view of bearing portion shown in FIG. 2, illustrating the relationship between adjacent roller elements.

Due to the change in diameter and/or offset between raceways that share a roller element 64, different contact angles are achieved. For example, and with additional reference to FIG. 4, line 70 illustrates where the raceways contact the roller elements 64 (the contact angle). In order for the bearing to provide high axial, radial and moment stiffness in all directions, and be considered and angular contact bearing, opposing contact angles are realized. In the thrust bearing in accordance with the present disclosure, opposing contact angles are accomplished by varying the diameter of the "integrated" raceways to achieve the desired contact angle.

For applications with extreme temperature excursions material selection becomes more important. A majority of pre-assembled independent bearing assemblies use steel races that, when used with devices formed from material other than steel (e.g., aluminum), can result in a large coefficient of thermal expansion (CTE) mismatch. Such mismatch is undesirable, particularly in applications that are subjected to large temperature swings. Various methods have been used to overcome the CTE mismatch. For example, component material may be changed to match the CTE of the steel bearing. This can be costly due to large assemblies with mismatched materials.

Further, separate (non-integrated) bearing assemblies require hard mounting to the rotating components. Given the large CTE mismatch that exists between aluminum and steel, for example, (both frequently used for rotating components and bearing assemblies respectively) the aluminum rotating component can deform the bearing raceways and cause the bearing to lock or seize up preventing rotation at extreme cold or hot temperatures. The integrated perimeter thrust bearing assembly in accordance with the present disclosure eliminates CTE mismatch between the bearing assembly and the rotating component by integrating at least part of the bearing system into the rotating component (e.g., the bearing race may be integrated within a surface of the rotating component). Thus, the same material is used for both the component and the bearing and therefore a CTE mismatch does not exist.

For example, if the first rotatable member 50*b* is formed from aluminum, then the race 62*b* is also formed from aluminum (the race is formed in the rotatable member). Similarly, if the first rotatable member 50*b* is formed from steel then the race 62*b* may also be formed from steel. The same applies for each race 62 and corresponding support structure of the bearing 60.

Additionally, as the diameter of the rotating components increases, the tolerances become increasingly difficult to produce and maintain, particularly for preloaded bearings. To address the tolerance issue of large bearings, as noted above the bearing system in accordance with the present disclosure can utilize a biasing member 68, such as a wave spring, which is much easier to manufacture than preloaded bearings (particularly at larger diameters). As is well known, a wave spring is a spring formed from pre-hardened flat wire in a process called "on-edge-coiling", also known as "edge winding". During this process, waves are added to the wire to give it a spring effect.

More specifically, instead of hard mounting the system to a stationary "ground" plate, the thrust bearing system can be mounted on a wave spring. This allows the bearing system to tolerate additional runout and therefore alleviates the ultra-tight machined raceway tolerances necessary to preload the bearing, thereby providing advantages in both manufacturing and cost.

Also, as the diameter of the rotating components increases, the cost of the bearing grows significantly. By integrating the raceways within the rotating components, the overall part count is reduced, and the need to manufacture two parts (the bearing and the rotating component) with approximately the same diameter is reduced to one rotating part with an integrated bearing raceway.

Another advantage of the integrated perimeter thrust bearing assembly in accordance with the present disclosure is that it can be easily serviced. More particularly, conventional bearing assemblies require a special fixture and/or special tools to disassemble and re-assemble the bearing, and such servicing is almost exclusively done by the bearing supplier. In contrast to the conventional bearing, since the preload is supplied by a biasing member (e.g., a wave spring), the integrated perimeter thrust bearing assembly can easily be dis-assembled, serviced, and re-assembled in any laboratory with no special tools or fixtures. This provides advantages in timing/scheduling as the bearing does not need to be returned to the supplier for any rework.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A bearing for providing rotation of at least one intermediate part relative to a first part and a second part, the bearing comprising:
    a first bearing race formed in the first part, the first bearing race having a raceway corresponding to a first diameter;
    a second bearing race and a third bearing race formed in the at least one intermediate part, the second bearing race and third bearing race having a raceway corresponding to a second diameter, wherein the first diameter is different from the second diameter;
    a fourth bearing race formed in the second part, the fourth bearing race having a raceway corresponding to the first diameter;
    a first plurality of roller elements arranged between the first raceway and the second raceway; and
    a second plurality of roller elements arranged between the third raceway and the fourth raceway.

2. The bearing according to claim 1, wherein a diameter of the first plurality of roller elements is an average of the first diameter and the second diameter.

3. The bearing according to claim 1, wherein a diameter of the second plurality of roller elements is an average of the first diameter and the second diameter.

4. The bearing according to claim 1, wherein at least one of
    i) the first race and the first part are formed from the same material,
    ii) the second race, the third raceway and the at least one intermediate part are formed from the same material, or
    iii) the fourth race and the second part are formed from the same material.

5. The bearing according to claim 1, wherein at least one race is formed from at least one of aluminum, steel, titanium, ceramic or plastic.

6. The bearing according to claim 1, wherein the first plurality of roller elements and the second plurality of roller elements are formed from steel, aluminum, titanium, ceramic or plastic.

7. The bearing according to claim 1, further comprising:
    a support structure arranged relative to the first part; and
    a biasing member arranged between the support structure and the first part, the biasing member urging the first part toward the second part to preload the first part, the at least one intermediate part and the second part.

8. The bearing according to claim 7, further comprising an outer housing, wherein the first part, the at least one intermediate part and the second part are arranged between the base structure and the outer housing.

9. The bearing according to claim 7, wherein the biasing member comprises a spring.

10. The bearing according to claim 9, wherein the spring comprises a wave spring.

11. The bearing according to claim 1, wherein a difference between the first diameter and the second diameter is between four-thousandths of an inch and eight-thousandths of an inch.

12. The bearing according to claim 1, wherein the at least one intermediate part comprises a plurality of intermediate parts arranged in a stacked configuration between the first part and the second part, each of the plurality of intermediate parts including two raceways corresponding to either the first diameter or the second diameter, wherein raceways of adjacent parts correspond to different diameters.

13. An antenna, comprising:
   at least one platter; and
   the bearing according to claim 1, wherein the at least one platter is mechanically coupled to the at least one intermediate part.

14. The antenna according to claim 13, wherein the at least one platter comprises a plurality of platters, and the at least one intermediate part comprises a plurality of intermediate parts, each of the plurality of platters mechanically connected to a respective one of the plurality of intermediate parts.

15. A method of manufacturing a thrust bearing integral with an object to be rotated, the object including a first part, at least one intermediate part, and a second part, the method comprising:

forming a first bearing race in the first part, the first bearing race having a raceway corresponding to a first diameter;

forming a second bearing race and a third bearing race in the at least one intermediate part, the second bearing race and third bearing race having a raceway corresponding to a second diameter, wherein the first diameter is different from the second diameter;

forming a fourth bearing race in the second part, the fourth bearing race having a raceway corresponding to the first diameter;

arranging a first plurality of roller elements between the first raceway and the second raceway; and arranging a second plurality of roller elements between the third raceway and the fourth raceway.

* * * * *